350-173

CROSS REFERENCE SEARCH ROOM

Nov. 15, 1955 D. H. KELLY ET AL 2,723,821

ADJUSTABLE SUPPORT FOR OPTICAL DEVICE

Filed Feb. 15, 1952 4 Sheets-Sheet 1 X2552

Inventor
Donald H. Kelly
Eugene M. Thayer
by Robert Cushman & Grover
Att'ys.

ADJUSTABLE SUPPORT FOR OPTICAL DEVICE

Inventors
Donald H. Kelly
Eugene M. Thayer
by Roberts, Cushman & Grover
Attys

ADJUSTABLE SUPPORT FOR OPTICAL DEVICE

Filed Feb. 15, 1952 4 Sheets-Sheet 3

Inventors
Donald H. Kelly
Eugene M. Thayer
by Roberts, Cushman & Grover
Att'ys

ADJUSTABLE SUPPORT FOR OPTICAL DEVICE

Inventors
Donald H. Kelly
Eugene M. Thayer
by Roberts, Cushman & Grover
Attys 2,723,821

ADJUSTABLE SUPPORT FOR OPTICAL DEVICE

Donald H. Kelly and Eugene M. Thayer, Los Angeles, Calif., assignors to Technicolor Motion Picture Corporation, Hollywood, Calif., a corporation of Maine Application February 15, 1952, Serial No. 271,716

4 Claims. (Cl. 248—179)

In various branches of the optical art it is desirable to divide a beam of light into three beams, as for example to expose three different films to three color aspects of a scene respectively, or to combine three beams into a single beam, as for example in projecting a color picture from three television tubes which reproduce the three different color aspects of a scene respectively. For such purposes it has been proposed to use an optical device having a primary axis and secondary axes extending from the primary axis in different directions, with a partial reflector perpendicular to the bisector of the angle between the primary axis and each of the secondary axes. To divide a beam it is transmitted along the primary axis to the reflectors where it is divided into three beams, one continuing along the primary axis and the other two being reflected along the secondary axes respectively; and to combine three beams they are transmitted along the three axes in the opposite directions and combined at the reflectors into a single beam which continues along the primary axis. In each case it is necessary to register the images formed by the beams with great precision owing to the fact that, where three colors are involved, misregistration is very noticeable. In the first example it is necessary to position each of the three images in its film gate in precisely the same relation to its aperture (that is to the pilot pins or other means for positioning the film in the aperture) so that when the three films are exposed corresponding points of the three exposures will be correspondingly positioned in relation to the sprocket holes with which the films are registered in reproducing or combining the three color-separation pictures. In the second example it is necessary to project images of the three television pictures in exact register.

Objects of the present invention are to provide an optical device of the type referred to which can quickly and easily be adjusted to afford exact register, which permits removal and replacement of the optical elements for cleaning or the like without affecting the adjustment, which is simple and economical in construction, and which is rugged and durable in use.

In one aspect the present invention involves an optical device having a partial reflector perpendicular to the bisector of the angle between the primary axis and each of the secondary axes and the aligning mechanism comprises means for tilting the device in different directions together with means for adjusting the device along the primary axis and adjusting the device along the secondary axes. In a more specific aspect the partial reflector is perpendicular to a plane containing both the primary axis and the secondary axes and the aforesaid adjustment along a transverse axis is parallel to said plane. In a still more specific aspect the secondary axes are perpendicular to the primary axis and extend from the primary axis in opposite directions. In the preferred embodiment the adjusting means comprises a stack of supports, means for adjusting one of the supports relatively to its support along a line parallel to the primary axis, means for adjusting another of the supports relatively to its support along a line parallel to the secondary axes, means for tilting another of the supports relatively to its support about an axis parallel to said primary axis, and means for tilting another of said supports about an axis parallel to said secondary axis.

Figure 2:
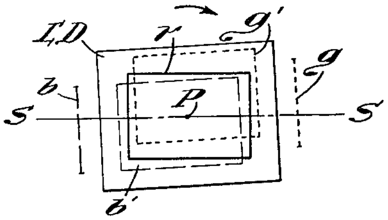
Fig. 2 is a similar diagram viewed along the primary axis before adjustment.
Figure 2A:
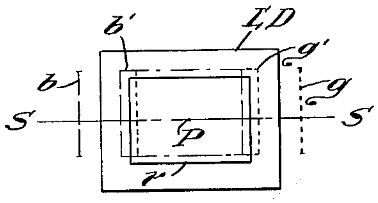
Figure 3:
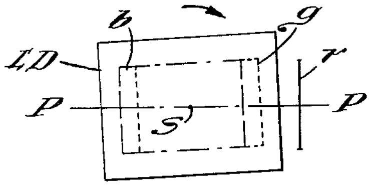
Figure 3A:
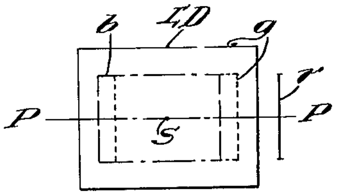
Figure 4:
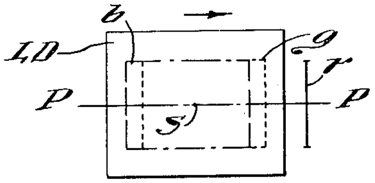
Figure 4A:
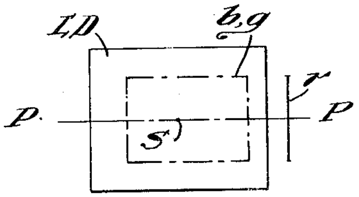
Figure 5:
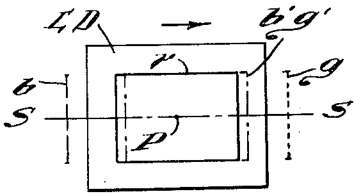
Figure 5A:
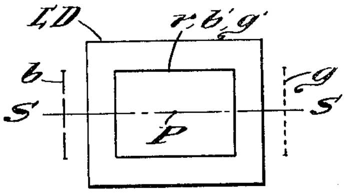
Figure 6:
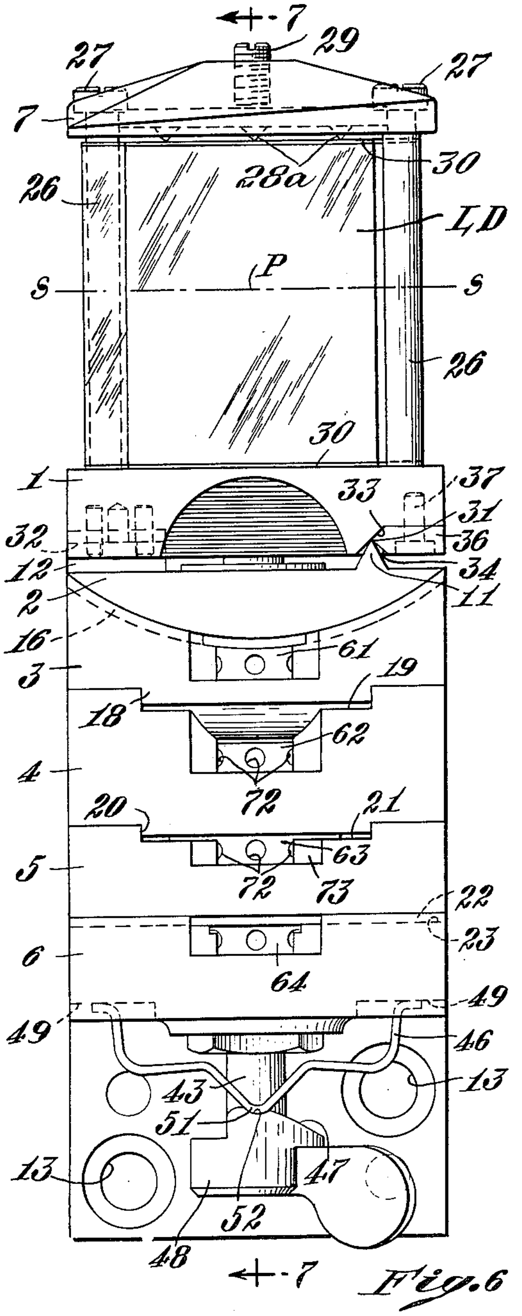
Figure 7:
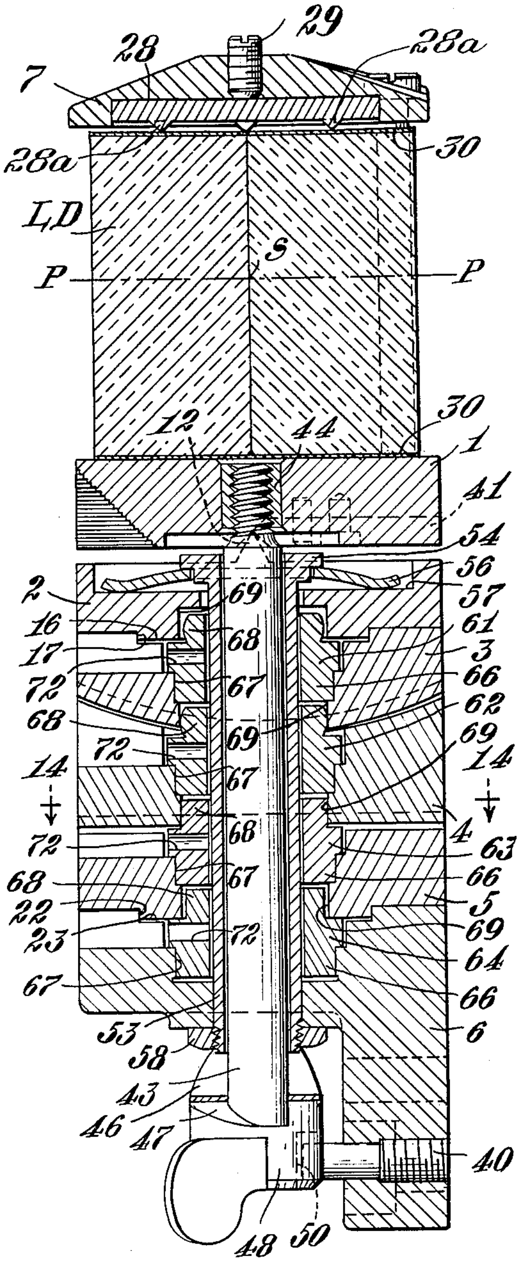
Figure 8:
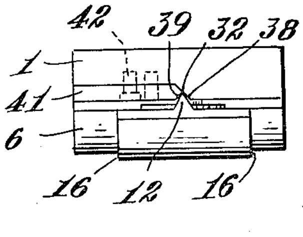
Figure 9:
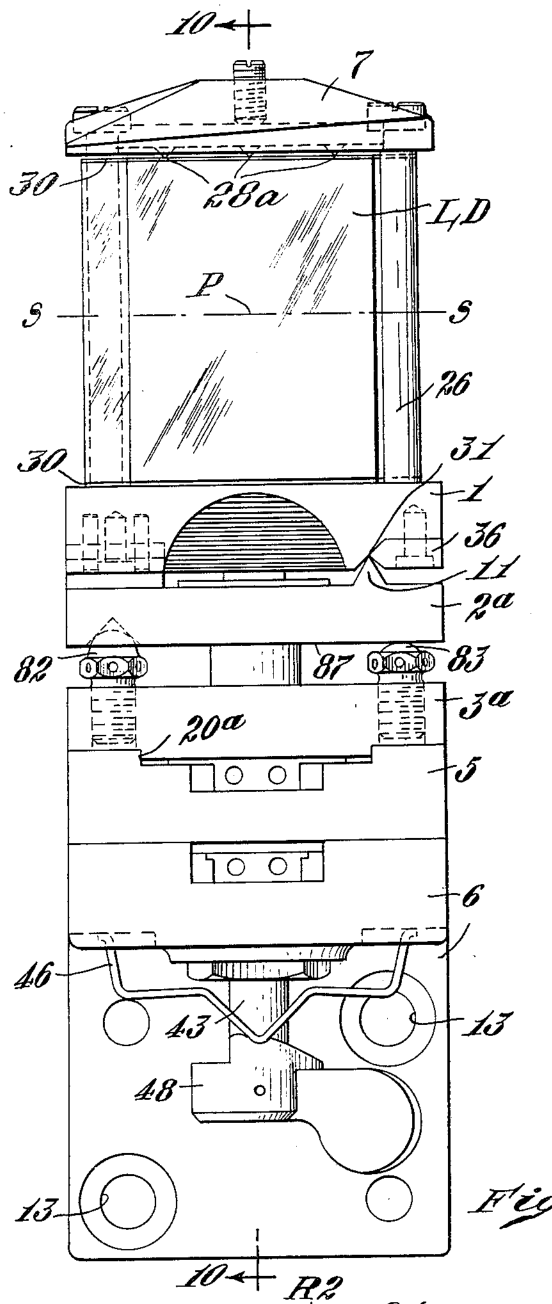
Figure 10:
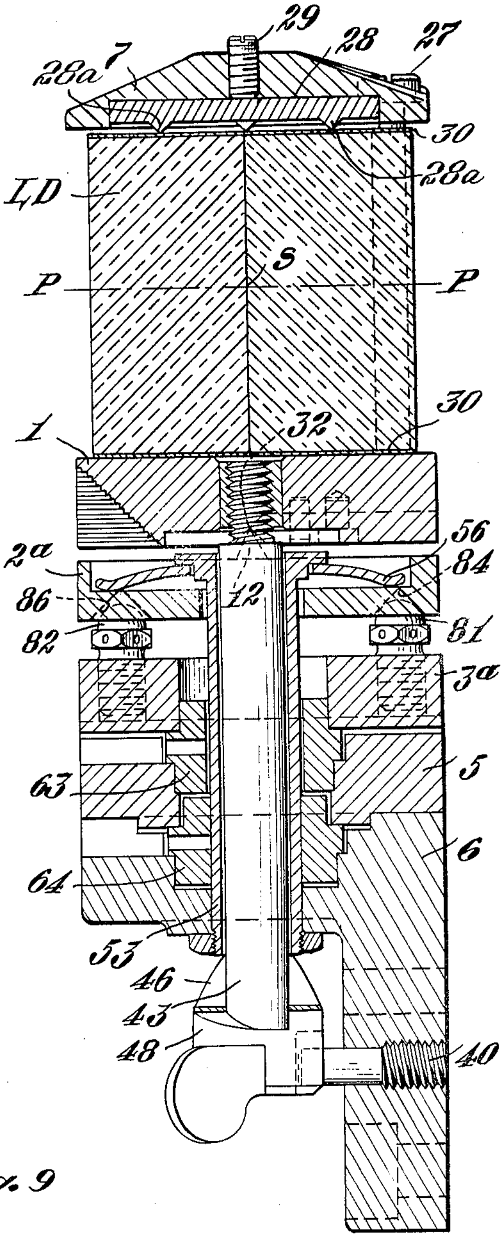
Figure 11:
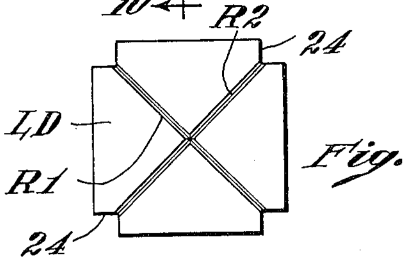
Figures 12, 13, 14:
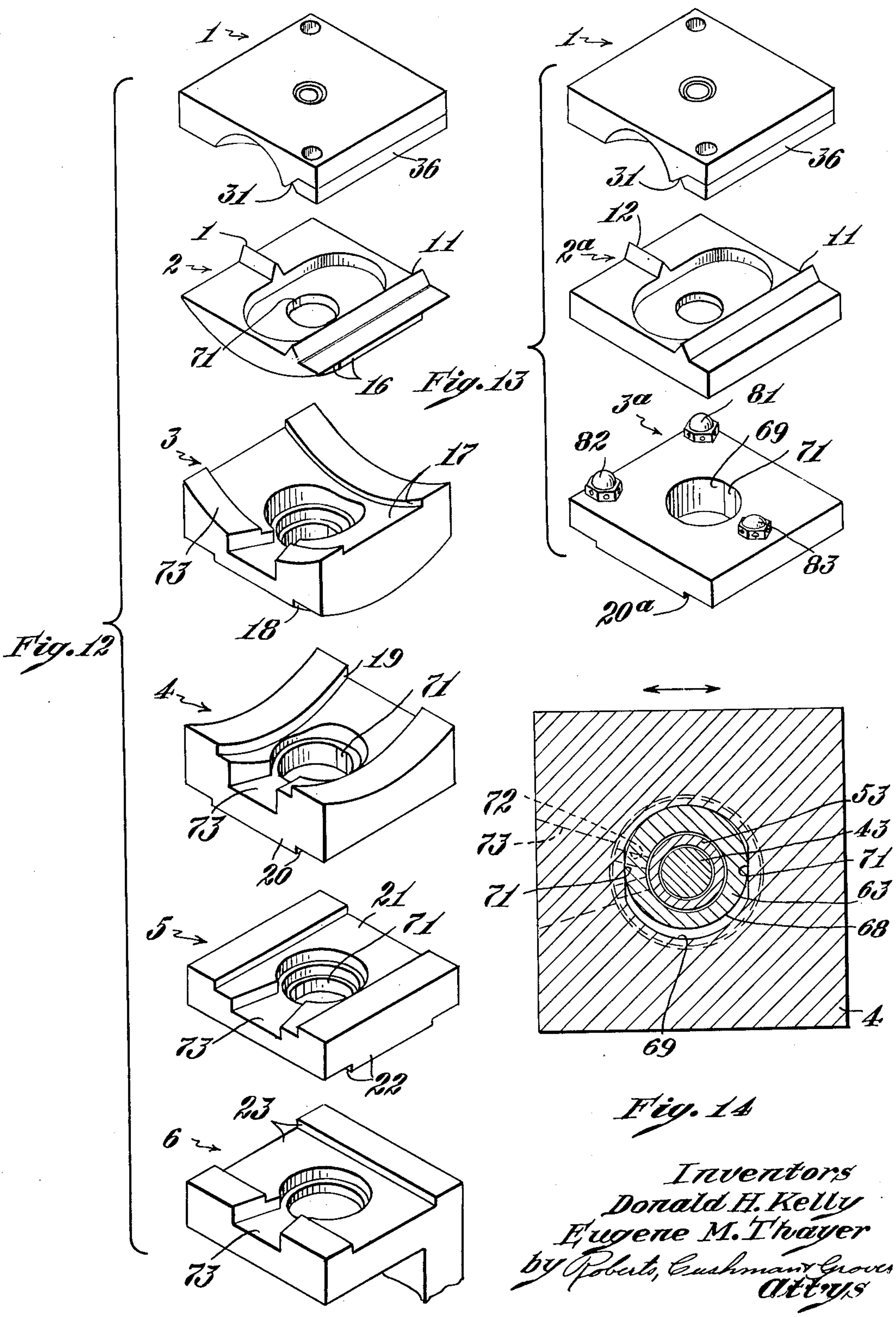

Fig. 2*a* is a similar view after the tilting adjustment about an axis parallel to the primary axis;

Fig. 3 is a similar diagram viewed along the secondary axis before the tilting adjustment about an axis parallel to the secondary axis;

Fig. 3*a* is a similar view after the tilting adjustment about an axis parallel to the secondary axis;

Fig. 4 is a similar diagram viewed along the secondary axis before the adjustment along the primary axis;

Fig. 4*a* is a similar view after the adjustment along the primary axis;

Fig. 5 is a similar diagram viewed along the primary axis before the adjustment along the secondary axis;

Fig. 5*a* is a similar view after the adjustment along the secondary axis;

Fig. 6 is an elevation of a light divider and adjusting means;

Fig. 7 is a section on lines 7—7 of Fig. 6;

Fig. 8 is a side elevation of parts of the device;

Fig. 9 is a view like Fig. 6 of another optical device embodying the invention;

Fig. 10 is a section on line 10—10 of Fig. 9;

Fig. 11 is a plan view of a light divider;

Fig. 12 is an exploded isometric view of the device shown in Figs. 6 to 8;

Fig. 13 is an exploded view of the device shown in Figs. 9 and 10, omitting similar parts shown in Fig. 12; and Fig. 14 is a section on line 14—14 of Fig. 7.

Figure 1:
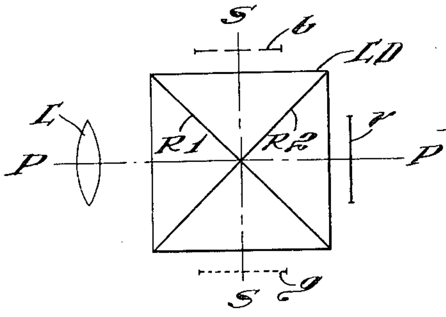
Fig. 1 is a diagram of an optical system for a three color camera viewed in the direction perpendicular to the plane of the aforesaid primary and secondary axes.

In Fig. 1 L represents the camera lens, LD a light divider comprising four prisms having partial reflectors R1 and R2 between their juxtaposed surfaces, P represents the primary axis, S is the secondary axes going in opposite directions from the primary axis and *b*, *g*, and *r* indicate the location of the blue, green and red images, these images being focused in film gates (not shown) which hold the films to be exposed, it being understood that the film gates are mounted on a suitable support independently of the light divider and are accurately positioned at the same levels and in the three focal planes respectively so that, when the light divider is adjusted to a predetermined position the three images will be in registry with each other, that is, corresponding points of the focused images will occupy corresponding positions with respect to the pilot pins or other film positioning means of the three film gates respectively.

In Figs. 1 to 5*a* the position of the red image *r* is indicated in solid lines, the green image *g* in dotted lines and the blue image *b* in broken lines. If the images could be viewed from the front, that is from the location of the lens L, they would appear to be superposed as indicated at *r*, *g'* and *b'* in Figs. 2, 2*a*, 5 and 5*a*.

If the light divider is tipped to the left from said predetermined position, as shown in an exaggerated manner in Fig. 2, it should be rotated in a clockwise direction about the primary axis, or an axis parallel to the primary axis, to bring the blue image *b* and the green image *g* to the same level as shown in Fig. 2*a*. If the prism is tipped forwardly as shown in Fig. 3 it should be rotated in a clockwise direction about the secondary axes S to bring the two images *b* and *g* to the level of the image *r* as shown in Fig. 3*a*. The adjustment lengthwise of the primary axis P e. g. from the position shown in Fig. 4 to that shown in Fig. 4*a*, shifts the blue and green images lengthwise relatively to each other to bring them into registry with each other. The adjustment along the secondary axes shifts the blue and green images lengthwise relatively to the red image, as for example from the offset position shown in Fig. 5 to the registered position shown in Fig. 5*a*. While the adjustments are preferably made in the aforesaid order, they may be made in any other order.

A convenient way to determine when the light divider is properly adjusted is to place in the film gates three opaque films having pin holes at the same locations in their respective picture areas. When viewed from the front through a telescope, the pin holes will appear to coincide only after the four adjustments. At first they would be displaced from each other both vertically and horizontally. After the first adjustment the holes in the blue and green apertures would appear at the same level but displaced from each other laterally, and from the red holes both laterally and vertically. After the second adjustment the three holes would appear at the same level but laterally offset with respect to each other. After the third adjustment the holes in the blue and green films would appear to coincide but would still be laterally offset with respect to the hole in the red film. After the last adjustment all three holes would appear to coincide.

In Figs. 6, 7, 8, 12 and 14 is shown one embodiment of the device for mounting the previously described light divider LD in optical apparatus. As shown in Figs. 6 and 7 the light divider LD is held between a clamping plate 7 and a prism table 1. The prism table 1 is supported by knife edges 11 and 12 on a stack of supports 2, 3, 4 and 5. The tables 2 to 5 in turn are carried on a bracket 6 which may be securely mounted in the optical apparatus by screws passing through holes 13. The tables 2 to 5 are nested together by means of tongue and groove portions 16 to 23 inclusive. The tongue 16 on the under side of support 2 and groove 17 of support 3 in which it slides are formed with a circular curve having its center approximately at the intersection of the primary axes P and the secondary axes S of the light divider LD so as to allow rotation of the light divider on an axis coincident with or parallel to the primary axis P. The tongue 18 of support 3 and groove 19 of support 4 are similarly curved to allow a sliding motion between supports 3 and 4 so as to rotate the light divider on an axis coincident with or parallel to the secondary axes S. Tongue 20 of support 4 and groove 21 of support 5 allow a linear sliding movement between supports 4 and 5 along an axis approximately parallel to the primary axis P. The tongue 22 of support 5 and groove 23 of bracket 6 allow a linear sliding movement between support 5 and the bracket 6 on a line approximately parallel to the secondary axes S and at right angles to the previously mentioned sliding movement.

In detail, the assembly of the above described parts is as follows. A light divider suitable for use in the present invention is shown in plan view in Fig. 11 and comprises four like prismatic wedges joined along partial reflecting surfaces R1 and R2 and formed with cutaway corners 24. The light divider is mounted on the upper surface of the table 1 with two of its corners 24 adjacent two posts 26 screwed in the table 1. The clamping plate 7 is secured to the posts 26 by screws 27, the posts being slightly higher than the light divider so as to provide a slight clearance between the underside of the clamping piece and the top of the light divider. Fitting in a recess on the underside of the clamping piece 7 is a metal block 28 having four bearing points **28*a* which are pressed on the top of the light divider by an adjusting screw 29. Thin paper pads 30** are placed at the top and the bottom of the prism for cushioning.

The underside of the table 1 is provided with two V-shaped grooves 31 and 32 for receiving the knife edges 11 and 12 respectively. The groove 31 is formed by the intersection of a plane surface 33 machined in the table 1 and a plane surface 34 of a block 36 secured to the underside of the table 1 by one or more screws 37, as shown in Fig. 6. As shown in Fig. 8 the V-shaped groove 32 is formed by the intersection of a plane surface 38 machined on the underside of the table 1 and the plane surface 39 carried by a block 41 which is secured to the underside of the table 1 by a machine screw 42. The table 1 is resiliently urged downwardly onto the knife edges by a bolt 43 extending from the underside of the bracket 6 through the supports 2 to 5. The upper end of the bolt 43 is secured in a threaded collar 44 which is anchored in the table 1. At the lower end of the bolt 43 is a generally U-shaped leaf spring 46 which bears on a cam surface 47 on the upper surface of the head 48 of the bolt. The ends of the spring 46 rest in grooves 49 in the underside of the bracket 6 and a V-shaped portion 51 of the spring is adapted to be locked in a radial groove 52 in the cam surface 47. When the head 48 of the bolt 43 is rotated the cam surface 47 compresses the spring 46 so that the bolt 47 is urged downward yieldingly to hold the table 1 on the knife edges 11 and 12 of the underlying support 2. The bolt 43 has been rotated to the desired position when a stop 40 engages the end wall of a recess 50 in the head 48 of the bolt.

Fitting loosely about the bolt 43 is a hollow bolt or collar 53. A nut 58, at the lower end of the collar, bears on the underside of the bracket 6, while the head 54 of the collar compresses a leaf spring 56 in a recess 57 at the top of the upper support 2. When the nut 58 is tightened the spring 56 yieldingly holds the supports 2 to 5 in firm superposition on the bracket 6.

Loosely fitted on the collar 53 are four cam members 61 to 64. Each of the cam members has a concentric annular portion 66 fitting closely in a circular recess 67 in the top surfaces of each of the supports 3 to 5 and the bracket 6. Each of the cams also has an eccentric upper portion 68 fitting in a recess 69 in the undersurface of each of the supports. As shown in Fig. 14, the recess 69 in the undersurface of the support 4, which is typical of the recesses in each of the other supports has two flat surfaces 71 spaced apart substantially the same distance as the actual diameter of the eccentric portion 68 of the cam 63. This spacing is less than the eccentric diameter of rotation of the cam 63 so that when the cam is rotated the support 4 will move in either of the directions indicated by the arrow relative to the underlying support 5 in which the concentric portion 66 of the cam 63 is anchored. In a similar fashion each of the other cams when rotated produce the movements previously described at right angles to the flat surfaces 71. Each of the cams 61 to 64 is provided with holes 72 in which a capstan pin may be inserted through an access slot 73 in each of the supports 3 to 5 and the bracket 6. The holes 72 shown in the drawings are representative of holes which extend halfway around the entire periphery of each cam at intervals suitably spaced to insure that at least one hole is accessible through the slots 73 regardless of the position of the cam.

The previously described adjustments of the light divider LD are accomplished with the above described mounting device as follows. The adjustment of the light divider about the primary axis, indicated schematically in Figs. 2 and 2*a* is produced by rotating the uppermost cam 61 thereby causing the upper support 2 to slide in a rotary fashion on the underlying support 3. Rotation of the light divider about the secondary axes or an axis parallel thereto is then produced by rotating the cam 62 so as to slide the support 3 in a rotary fashion relative to the underlying support 4. The adjustment lengthwise of the primary axis results from rotation of the cam 63, and similarly adjustment lengthwise of the secondary axes S results from rotation of the lowest cam 64.

In Figs. 9, 10 and 13 is shown a modified embodiment of the mounting device. In this embodiment the adjustment along the secondary axis is accomplished by means of support 5 and bracket 6 which are identical with those of the above described embodiment shown in Figs. 6, 7, 12 and 14, and hence the support 5 and bracket 6 are omitted from Fig. 13. The adjustment along the primary axis results from a relative sliding movement between the tongue 20*a* of a modified support 3*a* and the groove 21 of the support 5. The rotary movements of the light divider about the primary and secondary axes, or axes parallel thereto, are accomplished by means of modified supports 2*a* and 3*a*. Support 2*a* has a pair of knife edges 11 and 12 similar to those carried by the support 2 which fit in V-shaped grooves 31 and 32 respectively in the underside of the prism table 1. The support 2*a* is mounted on three spherical supporting members 81, 82 and 83. As shown in Figs. 9 and 10, the spherical supporting member 81 fits in a conical cup 84 formed in the underside of the support 2*a*. The spherical supporting member 82 fits in a recess 86 having an elliptical cross section which permits horizontal movement of the support 2*a* parallel to the primary axis P. The spherical supporting point 83 bears on the flat undersurface 87 of the support 2*a* and thus allows horizontal movement of the support 2*a* in any direction. By raising or lowering the spherical supporting points 81 to 83 the two rotational movements described in connection with Figs. 2 to 3*a* may be produced.

It should be understood that the present disclosure is for the purpose of illustration only and that this invention includes all modifications and equivalents which fall within the scope of the appended claims.

We claim:

1. For positioning an optical device having a primary axis and secondary axes perpendicular thereto, a holder comprising a base, a first support slidingly fitting said base to slide in a direction parallel to one of said axes, a second support slidingly fitting the first support to slide in a direction perpendicular to the first said direction, a mount for said device, means adjustably connecting said second support and said mount for tilting said mount on two axes parallel to said primary and secondary axes respectively, each of said supports having an aperture extending therethrough, two cam rings engaging said apertures respectively and being independently rotatable to cam said supports respectively in said two directions, and shaft means extending through said apertures and rings and interconnecting said base and mount to hold said mount and supports assembled on said base.

2. For positioning an optical device having a primary axis and secondary axes perpendicular thereto, a holder comprising a base, a first support slidingly fitting said base to slide in a direction parallel to one of said axes, a second support slidingly fitting the first support to slide in a direction perpendicular to the first said direction, a mount for said device, means adjustably connecting said second support and said mount for tilting said mount on two axes parallel to said primary and secondary axes respectively, each of said supports having an aperture extending therethrough, two cam rings engaging said apertures respectively and being independently rotatable to cam said supports in said two directions, and shaft means extending through said apertures and rings and yieldingly interconnecting said base and mount to hold said mount and supports loosely assembled on said base.

3. For positioning an optical device having a primary axis and secondary axes perpendicular thereto, a holder comprising a base, a first support slidingly fitting said base to slide in a direction parallel to one of said axes, a second support slidingly fitting the first support to slide in a direction perpendicular to the first said direction, a mount for said device, means adjustably connecting said second support and said mount for tilting said mount on two axes parallel to said primary and secondary axes respectively, each of said supports having an aperture extending therethrough, two cam rings engaging said apertures respectively and being independently rotatable to cam said supports in said two directions, shaft means extending through said apertures and rings and connected to said mount, cam means on said shaft adjacent said base, and spring means compressed between said cam means and base to hold said mount and supports assembled on said base, said cam means being rotatable to reduce compression on said spring means and hold said mount and support loosely assembled in said base while said mount is positioned by adjustment of said supports and tilting means.

4. For positioning an optical device having a primary axis and secondary axes perpendicular thereto, a holder comprising a base, a first support slidingly fitting said base to slide in a direction parallel to one of said axes, a second support slidingly fitting the first support to slide in a direction perpendicular to the first said direction, a mount for said device, means adjustably connecting said second support and said mount for tilting said mount on two axes parallel to said primary and secondary axes respectively, each of said supports having an aperture extending therethrough, two cam rings, one ring engaging said base and first support and the other ring engaging said first and second support, said rings being independently rotatable to cam said supports in said two directions, and shaft means extending through said apertures and rings and interconnecting said base and mount.

References Cited in the file of this patent

UNITED STATES PATENTS

| | | |
|---|---|---|
| 964,709 | Swasey | July 19, 1910 |
| 1,919,020 | Hillman | July 18, 1933 |
| 2,072,091 | Ball et al. | Mar. 2, 1937 |
| 2,354,515 | Greenwood | July 25, 1944 |
| 2,604,808 | Sachtleben | July 29, 1952 |
| 2,614,452 | Coote et al. | Oct. 21, 1952 |